United States Patent [19]

Duvdevani et al.

[11] Patent Number: 4,523,929
[45] Date of Patent: Jun. 18, 1985

[54] ANTIMISTING SYSTEM FOR HYDROCARBON FLUIDS

[75] Inventors: Ilan Duvdevani, Leonia; John A. Eckert, Mountainside; Donald N. Schulz, Annandale; Kissho Kitano, Fanwood, all of N.J.

[73] Assignee: Exxon Research & Engineering Co., Florham Park, N.J.

[21] Appl. No.: 625,831

[22] Filed: Jun. 28, 1984

Related U.S. Application Data

[63] Continuation-in-part of Ser. No. 565,105, Dec. 23, 1983, abandoned.

[51] Int. Cl.$^3$ ................................................. C10L 1/18
[52] U.S. Cl. ................................................. 44/62; 44/70
[58] Field of Search ................... 44/62, 70; 525/329.5; 524/562

[56] References Cited

U.S. PATENT DOCUMENTS

| | | | |
|---|---|---|---|
| 2,599,119 | 6/1952 | McQueen | 524/562 |
| 4,002,436 | 1/1977 | Osmond et al. | 44/62 |
| 4,240,928 | 12/1980 | Ueno et al. | 526/144 |
| 4,263,196 | 4/1981 | Schumacher et al. | 524/562 |
| 4,381,414 | 4/1983 | Beach et al. | 44/62 |

Primary Examiner—Y. Harris-Smith
Attorney, Agent, or Firm—Richard E. Nanfeldt

[57] ABSTRACT

An antimisting hydrocarbon solution comprising a hydrocarbon mixed with a copolymer of an alpha-olefin and a vinyl alkylenecarboxylic acid, wherein the concentration of said copolymer in said hydrocarbon is about 0.05 to about 2 grams per 100 ml of said solution, wherein such copolymer has the formula:

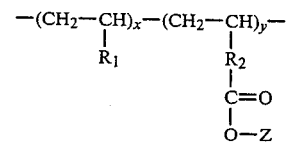

wherein $R_1$ is an alkyl group having about 1 to about 25 carbon atoms, $R_2$ is an alkylene group having about 3 to 17 carbon atoms, Z is a mixture of hydrogen and an alkyl group having about 1 to 25 carbon atoms, x is about 95.0 to about 99.99 mole % and y is about 0.01 to about 5 mole %, wherein hydrogen comprises about 1 to about 45 mole % of Z.

3 Claims, No Drawings

ANTIMISTING SYSTEM FOR HYDROCARBON FLUIDS

CROSS-REFERENCE TO RELATED APPLICATIONS

This application is a continuation-in-part of U.S. Ser. No. 565,105, filed Dec. 23, 1983, now abandoned.

FIELD OF THE INVENTION

The present invention relates to hydrocarbon, preferably jet fuel solutions having antimisting properties in which the hydrocarbon solution contains a copolymer of an alpha-olefin and a vinyl alkylenecarboxylic acid.

BACKGROUND OF THE INVENTION

Polymeric materials are useful as viscosity enhancers when dissolved in the appropriate solvent system. The principle reason for this behavior is due primarily to the large volume which a single macromolecular chain can occupy within the solvent. An increase in the size of the chain produces a concomitant enhancement in the solution viscosity. However, when the polymer chain is placed in a shear field, segmental orientation takes place in the direction of the shearing force. The viscosity of the fluid dramatically drops due to this orientation phenomena. This is a typical behavior of most solutions containing dissolved polymeric materials. However, if the polymer molecule has a high molecular weight with a relatively flexible backbone and the solvent viscosity is sufficiently high, different behavior can be anticipated. It has been shown by several groups that, with increasing shear rates, the viscosity should show a decrease, followed by a minimum value and a small subsequent increase in cases where both solvent viscosity and polymer molecular weight are very hight. This latter effect gives rise to a slight dilatant behavior. However, the above-mentioned conditions required for the appearance of a slight shear thickening behavior in these polymeric solution systems are not applicable for many technologically interesting fluids. Inmost of the common synthetic polymers, it is difficult from a synthetic viewpoint to obtain sufficiently high molecular weight and, in addition, most solvents (for example, jet fuels) have rather low viscosities.

U.S. Pat. No. 4,002,436 discloses hydrocarbon jet fuel compositions of addition polymers with associative polar bonds. However "the polymers used in [that] invention will generally be of the free radical addition type since these are the simplest to make in the presence of polar groups" (column 4, lines 16-18). Alkene hydrocarbon or alpha-olefin polymers usually require post polymerization reaction to introduce the polar groups and are thus generally excluded from this invention (column 4, lines 58-68, and column 5, lines 1-3). Moreover, compositions of U.S. Pat. No. 4,002,436 make no claims to showing dilatant or shear thickening rheology (i.e. instantaneous increase in viscosity, with increasing shear rate).

This invention discloses the novel and unexpected result that polymers containing low levels of carboxylic acid side groups are capable of enhancing the viscosity of hydrocarbon solutions under relatively broad shear conditions. With these unique polymeric materials, dilatant behavior occurs in hydrocarbon fluids which are of broad technological utility and useful in antimisting applications, preferably for jet fuel. It is further observed that under the identical experimental conditions, the viscosity of related copolymer solutions containing no carboxylic acid side groups show the normal shear thinning behavior.

Polymers with very high molecular weight can be used to modify a solvent for antimisting behavior. In this invention it is diasloed that an alternative to ultra high molecular weight additives are lower molecular weight polymers which are capable of associating in solution, thereby building a network of a very high molecular weight. A way for achieving such networks is the association of polymers containing a low level of carboxylic acid side groups.

In order to avoid phase separation of the associating polymer in solution, the acid density along the polymer backbones should be relatively low. The resulting solution of such a polymer is then significantly more viscous than solutions containing related polymers which do not associate. Upon addition of a strongly polar agent such as an alcohol the associations can be disturbed and the viscosity reduced.

It was found that for a given range of the various parameters that may be varied in a carboxylic acid containing polymer solution, an unexpected shear thickening (dilatant) behavior may be obtained. These parameters include:

- Backbone nature of the polymer (or copolymer).
- The polar group densities along the polymer backbones.
- The molecular weight of the polymer.
- The solvent (and cosolvent, if any).
- The concentration of polymer in solution.

As explained above, most solutions of high molecular weight polymers are expected to exhibit a shear thinning behaior. Polymers containing carboxylic acid side groups under narrow conditions seem on the other hand to possess an ability to establish even larger networks or act as if networks are larger under high shear rates resulting in shear thickening.

Shear thickening behavior can be useful in affecting antimisting characteristics. Such a solution can behave as a fairly low viscosity fluid at low shear rates. However, the viscosity begins to rise as the shear rate is progressively increased. Accordingly, the solution can more effectively resist break-up into a mist of minute droplets. This is a very desirable attribute in a variety of fluids of technological interest and specifically jet fuels. Another desirable attribute is to be able to reverse (or erase) the above-mentioned antimisting behavior and render it atomizable. With regard to polymers of the instant invention, this is readily achieved through addition of a soluble component capable of weakening or totally disrupting the associations which hold the network together. Such a component should be highly polar, soluble in the solution containing the dissolved associating polymer and capable of efficiently migrating (and disrupting) the associations. Alcohols and amines and low molecular weight carboxylic acids are only a few of many possible examples.

U.S. Pat. No. 3,679,382 teaches the thickening of aliphatic hydrocarbons with synthetic organic polymers of alkylstyrene or lauryl acrylate and olefinically unsaturated emulsion copolymerizable acids, amides, hydroxyacrylic esters, sulfonic acids, etc. It is emphasized in this patent (column 3, lines 69-75) that it is critical that in the preparation of such polymers, no surface active agent, catalyst or other additive be employed which introduces a metallic ion into the system.

Therefore, it is preferred to employ ammonium or amine salts. This patent also fails to teach shear thickening compositions.

The instant invention contains no alkylstyrenes or lauryl acrylates and the instant olefinically unsaturated acids and esters are not emulsion copolymerizable. The instant acids and esters have an alkyl spacer group separating the acid or ester from the olefinic double bond thus rendering them nonpolymerizable by free radical emulsion polymerization. The instant copolymers are prepared by Ziegler-Natta polymerization, which do indeed use metallic catalysts. Such metallic species are precluded from U.S. Pat. No. 3,679,382. The instant invention also teaches shear thickening composition.

Finally, the novel polymeric systems described here are readily soluble in aliphatic as well as aromatic hydrocarbons making them useful as additives to jet fuels and other distillates of crude oil.

SUMMARY OF THE INVENTION

The present invention relates to hydrocarbon, specifically jet fuel, solutions having dilatant properties in which the hydrocarbon solution contains a copolymer having carboxylic acid side groups.

GENERAL DESCRIPTION OF THE INVENTION

The hydrocarbon solution of the instant invention, which exhibits antimisting properties, are copolymers of an alpha olefin and a vinyl alkenecarboxylic acid.

The copolymer complex is characterized as having polymer backbones which are substantially soluble in the organic liquid, and pendant $(CH_2)_8COOH$ alklenecarboxylic acid side groups.

The copolymer of the instant invention is a copolymer containing an alpha olefin and a mixture of a vinyl alkenecarboxylic acid and a vinyl alkylenecarboxylic ester having about 4 to about 20 carbon atoms, more preferably about 9 to about 18 and most preferably about 10 to about 16, wherein an alkyl group is situated between the acid or ester group and the carbon of the double bond of the monomer, wherein the resulting alklenecarboxylic acid side groups are randomly distributed along the alpha-olefin backbone. The alpha-olefin has about 3 to about 27 carbon atoms, more preferably about 6 to about 25, and most preferably about 6 to about 18. The copolymer contains a mixture of about 0.01 to about 5 mole % of the alklenecarboxylic acid and alkylenecarboxylic ester side groups more preferably about 0.05 to about 3 and most preferably about 0.1 to about 2. The number average molecular weight as measured by GPC of the alpha-olefin copolymer is about 10,000 to about 20,000,000, more preferably about 50,000 to about 15,000,000, and most preferably about 100,000 to about 10,000,000. The copolymer of the alpha-olefin and vinyl alklenecarboxylic acid is formed by partially hydrolyzing with concentrated sulfuric acid or other suitable acids having a sufficiently low Ph to effect hydrolysis, wherein the hydrolysis occurs in a solvent which is inert itself to hydrolysis such as an aliphatic or aromatic hydrocarbon. The copolymer of an alpha-olefin and a vinyl alkylene ester is partially hydrolyzed according to the reaction scheme:

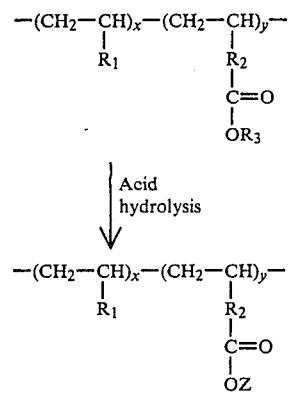

wherein Z is a mixture of H and $R_3$, wherein $R_3$ is an alkyl group having about 1 to about 25 carbon atoms, wherein $R_1$ is an alkyl group having about 1 to about 25 carbon atoms, $R_2$ is an alkylene group having about 3 to about 17 carbon atoms, x is about 99.99 to about 95.0 mole %, more preferably about 99.95 to about 97.0 and most preferably about 99.90 to about 98.0, and y is about 0.01 to about 5.0 mole %, more preferably about 0.05 to about 3.0 and most preferably about 0.1 to about 2.0. y comprises a mixture of carboxylic acid and ester containing units, since the hydrolysis is only partial, wherein only a portion of the ester groups are hydrolyzed to carboxylic acid groups. The final hydrolyzed product is a mixture of ester species and acid species, wherein the mixture contains about 0.1 to about 45 mole% of the acid species, more preferably about 2 to about 40, and most preferably about 4 to about 20.

The hydrocarbon solution of the copolymer of the alpha-olefin and the vinylalklenecarboxylic acid which exhibits antimisting properties is formed by forming a solution of the copolymer in an organic liquid, wherein the organic liquid which has a solubility parameter of less than 9.5 and is selected from the group consisting of mineral oil, synthetic oil, alkanes, cycloalkanes and aromatics and mixtures thereof. The concentration of the copolymer in the solution is about 0.05 to about 2 grams per 100 ml of organic, liquid, more preferably about 0.1 to about 0.5.

The method of the instant invention includes optionally incorporating a cosolvent in order to weaken or totally disrupt the associations which weld the intercomplex polymer together thereby reserving the shear thickening phenomonea. For example, a polar cosolvent can be added into the mixture of organic liquid and polymer complex, to solubilize the pendant carboxylic acid groups. The polar cosolvent will have a solubility parameter of at least 10.0, more preferably at least 11.0, and may comprise from 0.1 to 40, preferably 0.5 to 20 weight percent of the total mixture of organic liquid, ionomeric polymer, and polar cosolvent.

There is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S_p$, then we require that:

$$S_p \geq S_L + 1.0$$

In other words, the polar cosolvent will be substantially more polar than the organic liquid to be thickened.

Normally, the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent.

DESCRIPTION OF THE PREFERRED EMBODIMENTS

The following are preferred embodiments of the instant invention.

EXAMPLE 1

Synthesis of Poly(1-octene) having alkylenecarboxylic acid side chains (a) Copolymerization of 1-octene and methyl-10-undecenoate A 2-liter flask was charged with a mixture of n-heptane (480 ml), 1-octene (500 ml), methyl-10-undecenoate (6.4 g), and diethyl aluminum chloride (72 mmole), were heated to 60° C. The catalyst containing $TiCl_3$ (2.0 g) in n-heptane (20 ml) (described in U.S. Pat. No. 4,240,928) was then added. After stirring for 1 hr., the reaction was terminated with a small amount of isopropyl alcohol. The polymer was precipitated and washed with isopropyl alcohol and vacuum dried at 60° C. to yield 87.9 g of colorless material. IR spectrum showed that the copolymer contains 0.8 mole % of methyl-10-undecenoate unit. The inherent viscosity was 4.3 dl/g in a decalin solution. Mn was about $4.6 \times 10^6$ as measured by GPC.

(b) Hydrolysis of 1-octene-methyl-10-undecenoate copolymer

1-Octene-methyl-10-undecenoate copolymer was converted to a respective sample having alkylenecarboxylic acid side chains as described below.

A solution of the copolymer (10 g) in Xylene (500 g) was placed in a 2-liter flask and heated to 40° C. Concentrated sulfuric acid (20 ml.) was then added. After stirring for one hour, the reaction mixture was cooled down and washed with a mixture of water and isopropyl alcohol three times. A white product was obtained by precipitating from the solution with isopropyl alcohol. Further purification by reprecipitation and drying in a vacuum oven at 50° C. gave 8.0 g of colorless rubbery polymer. IR spectrum showed that 3 percent of methyl ester group was converted into corresponding acid form. The partially hydrolyzed copolymer was then dissolved in xylene at a concentration of 1 wt percent. The resulting viscosity of this solution at 25° C. as a function of shear rate was:

| Shear Rate $sec^{-1}$ | Viscosity cP |
| --- | --- |
| 3 | 63 |
| 10 | 72 |
| 20 | 99 |
| 30 | 171 |
| 60 | 378 |

These data demonstrate a high effectiveness in viscosification as well as dilatancy or shear thickening.

The high viscosification can be demonstrated by comparing the above viscosity data to viscosity of a high molecular weight polyisobutylene (Exxon L-200, with a weight average molecular weight above 2 million) in xylene at the same concentration of 1 weight percent. The later solution has a low shear viscosity of about 24 cP at 3 $sec^{-1}$ and is shear thinning such that the viscosity drops to about 14 cP at 300 $sec^{-1}$. Another comparison could be made to a solution of the non-hydrolyzed copolymer which was used to prepare the above partially hydrolyzed copolymer. The viscosity of this last copolymer is a xylene solution at 1 weight percent concentration was about 6 cP.

EXAMPLE 2

Destruction of Viscosification and Shear Thickening

A solution of a partially hydrolyzed copolymer of 1-octene and methyl-10-undecenoate was prepared in xylene at a concentration of 0.5 weight percent. The copolymer was similar in molecular architecture to the one described in Example 1 except that it had a higher degree of hydrolysis conversion of about 13 percent. The viscosity of this 0.5 weight percent solution was about 30 cP at 6 $sec^{-1}$ and 420 cP at 18 $sec^{-1}$ and at 25° C. After adding 0.5 percent by weight of methanol to the solution the viscosity dropped to about 2.5 cP. When 0.1 weight percent of stearic acid was added to the solution rather than methanol the viscosity dropped to approximately the same value of 2.5 cP. In both cases the modified solutions exhibited a Newtonian nature.

This example demonstrates that some polar additives such as methanol or stearic acid can be effective agents for reversing the viscosification and shear thickening exemplified by the class of materials claimed in this instant invention.

EXAMPLE 3

Flow in a Tubless Siphon For Solutions in Jet Fuel

A solution of a partially hydrolyzed copolymer of 1-octene and methyl-10-undecenoate was prepared in jet fuel. The polymer was the same as that in Example 1 and the solution was prepared at a concentration of 0.5 weight percent. The solution was then studied in a tubless siphon flow and the height at which the unsupported fluid column broke was recorded. The solution was then diluted to various lower concentrations which were also studied in tubless siphon flow. The column heights at break for the various concentrations of the polymer solution in jet fuel were:

| Polymer Concentration (wt %) | Column Height (mm) |
| --- | --- |
| 0.5 | 16 |
| 0.4 | 12 |
| 0.3 | 4 |
| 0.2 | 2–3 |
| 0.1 | 1–2 |

The siphon height at break for the 0.5 weight percent solution was changed from 16 mm to less than 6 mm upon addition of 1000 ppm of stearic acid.

Since tubless siphon height has been correlated with antimisting activity, this example demonstrates that the polymer of the instant invention is expected to be an effective agent for antimisting of jet fuel by virtue of its ability to affect a high extensional viscosity in jet fuel solutions. The example also shows that a polar additive such as stearic acid can be effective for significantly reversing the antimisting characteristics.

What is claimed is:

1. An antimisting hydrocarbon solution comprising a organic liquid mixed with a copolymer of an alpha-olefin and a vinyl alkylenecarboxylic acid, wherein the concentration of said copolymer in said hydrocarbon is about 0.05 to about 2 grams per 100 ml of said solution, wherein such copolymer has the formula:

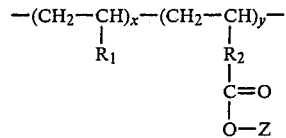

wherein $R_1$ is an alkyl group having about 1 to about 25 carbon atoms, $R_2$ is an alkylene group having about 3 to 17 carbon atoms, Z is a mixture of hydrogen and an alkyl group having about 1 to 25 carbon atoms, x is about 95.0 to about 99.99 mole % and y is about 0.01 to about 5 mole %, wherein hydrogen comprises about 1 to about 45 mole% of Z said organic liquid having a solubility parameter of less than 9.5 and being selected from the group consisting of mineral oil, synthetic oil, alkane, cycloalkane and aromatic and mixtures thereof.

2. The antimisting solution according to claim 1 further including about 1000 ppm to about 10 weight percent of a polar cosolvent.

3. The antimisting solution according to claim 1, wherein said hydrocarbon is a jet fuel.

* * * * *